United States Patent
Ringen et al.

(10) Patent No.: US 8,116,750 B1
(45) Date of Patent: Feb. 14, 2012

(54) SYSTEM AND METHOD FOR NETWORK CONTROL OF AT LEAST ONE CELLULAR TELEPHONE

(75) Inventors: Deron J. Ringen, Kennesaw, GA (US); Brenda S. Wilch-Ringen, Kennesaw, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 2558 days.

(21) Appl. No.: 10/158,812

(22) Filed: May 30, 2002

(51) Int. Cl.
  *H04M 3/42* (2006.01)
(52) U.S. Cl. ........ 455/415; 455/405; 455/410; 455/411; 455/432.3; 455/565
(58) Field of Classification Search .......... 455/415, 455/416, 26.1, 518, 433, 435.1, 519, 554.2, 455/555, 561
See application file for complete search history.

(56) References Cited

U.S. PATENT DOCUMENTS

| | | | |
|---|---|---|---|
| 5,485,505 A | 1/1996 | Norman et al. | |
| 5,815,808 A * | 9/1998 | Valentine | 455/422.1 |
| 5,864,757 A | 1/1999 | Parker | 455/418 |
| 5,884,193 A | 3/1999 | Kaplan | |
| 5,930,703 A | 7/1999 | Cairns | |
| 5,970,405 A | 10/1999 | Kaplan et al. | |
| 6,125,273 A | 9/2000 | Yamagishi | |
| 6,151,493 A | 11/2000 | Sasakura et al. | 455/421 |
| 6,208,872 B1 * | 3/2001 | Schmidt | 455/518 |
| 6,233,447 B1 | 5/2001 | Tomoike | |
| 6,259,908 B1 | 7/2001 | Austin | 455/411 |
| 6,269,248 B1 | 7/2001 | Jayawardene | 455/465 |
| 6,321,079 B1 | 11/2001 | Cooper | 455/411 |
| 6,351,639 B1 | 2/2002 | Motohashi | 455/420 |
| 6,529,725 B1 * | 3/2003 | Joao et al. | 455/406 |
| 6,751,485 B2 * | 6/2004 | Ranta | 455/567 |
| 6,757,534 B2 | 6/2004 | Bach et al. | |
| 6,788,673 B1 * | 9/2004 | Koskinen | 370/352 |
| 6,788,932 B2 | 9/2004 | Nakamichi | |
| 7,177,632 B1 | 2/2007 | Ringen | |
| 7,336,945 B2 | 2/2008 | Ringen | |
| 2001/0013062 A1 * | 8/2001 | Ono | 709/218 |
| 2001/0016487 A1 | 8/2001 | Hiatt, Jr. et al. | |
| 2002/0142807 A1 | 10/2002 | Cho | |
| 2002/0165012 A1 | 11/2002 | Kirbas et al. | |
| 2003/0112943 A1 | 6/2003 | Kamil | |
| 2003/0152198 A1 | 8/2003 | Price | |
| 2003/0153268 A1 | 8/2003 | Tsai | |
| 2004/0002329 A1 | 1/2004 | Bhatia et al. | |

FOREIGN PATENT DOCUMENTS

| | | | | |
|---|---|---|---|---|
| WO | W/O 93/03585 | * | 2/1993 | 7/26 |

OTHER PUBLICATIONS

Ringen; U.S. Appl. No. 10/159,636, filed May 30, 2002.
Ringen; U.S. Appl. No. 11/611,006, filed Dec. 14, 2006.
Non-Final Rejection mailed Feb. 22, 2005 for U.S. Appl. No. 10/159,636.

(Continued)

*Primary Examiner* — Dai A Phuong
(74) *Attorney, Agent, or Firm* — Turocy & Watson, LLP (57) ABSTRACT

Preferred embodiments of the present invention provide a system and method for enabling an owner of one or more cellular telephones to select one or more telephone number(s) to which the cellular telephone(s) may place calls, and one or more telephone number(s) from which the cellular telephone(s) may receive calls, the control of the cellular telephone(s) occurring at the wireless network.

48 Claims, 4 Drawing Sheets

OTHER PUBLICATIONS

Non-Final Rejection mailed Aug. 23, 2005 for U.S. Appl. No. 10/159,636.
Non-Final Rejection mailed Dec. 14, 2005 for U.S. Appl. No. 10/159,636.
Final Rejection mailed Jun. 6, 2006 for U.S. Appl. No. 10/159,636.
Notice of Allowance mailed Oct. 2, 2006 for U.S. Appl. No. 10/159,636.
Non-Final Rejection mailed Jun. 13, 2007 for U.S. Appl. No. 11/611,006.
Notice of Allowance mailed Oct. 17, 2007 for U.S. Appl. No. 11/611,006.
Ringen; U.S. Appl. No. 12/023,465, filed Jan. 31, 2008.
Non-Final Rejection mailed Apr. 27, 2010 for U.S. Appl. No. 12/023,465.
Final Rejection mailed Aug. 30, 2010 for U.S. Appl. No. 12/023,465.
Non-Final OA dated Mar. 30, 2011 for U.S. Appl. No. 12/023,465, 18 pages.

* cited by examiner

SYSTEM AND METHOD FOR NETWORK CONTROL OF AT LEAST ONE CELLULAR TELEPHONE

TECHNICAL FIELD

The present invention generally relates to telecommunications, and more particularly, to control over a group of cellular telephones.

BACKGROUND OF THE INVENTION

Cellular telephones are becoming increasingly popular, and public use of cellular telephones has significantly increased over the last several years. The purchase and use of cellular telephones has become common, including for use by groups, such an employer purchasing cellular telephones for use by a group of employees. To support the increased use of cellular telephones, various wireless networks have been created, and expanded, to allow use of cellular telephones in increasing areas of coverage. In general, a wireless service provider, upon purchase of the cellular telephones by the owner, enables the use of the cellular telephones by activating the cellular telephones. The cellular telephones operate by communicating with the wireless network to which the owner/user subscribes through a transmitter/receiver within the cellular telephones.

A typical wireless network consists of multiple, low-power transmitters/receivers, typically referred to as base stations, providing wireless service to a series of overlapping coverage areas referred to as cells. Each cell operates within a predetermined set of frequencies, with one or more frequencies designated as control frequencies used to manage the network. Usually, a Mobile Telephone Switching Office ("MTSO") is connected to one of the base stations, and the MTSO manages a set of cells, controlling a portion of the typical wireless network by use of the control frequencies.

A large wireless network may consist of several different MTSOs, each MTSO in control of multiple cells, and the MTSOs in communication with each other, either directly or through the Public Switched Telephone Network ("PSTN"). Each MTSO will also communicate with the PSTN in order to connect calls from cellular telephones to and from standard PSTN telephones.

Additionally, in the case of a large wireless network with multiple MTSOs, there will be an overall network control in communication with, and controlling, the multiple MTSOs in the wireless network. In the case of a small wireless network, the overall network control may also act as the MTSO, eliminating the need for a separate MTSO.

A cellular telephone operating within the coverage of a particular cell receives transmissions from, and sends transmissions to, the transmitter/receiver providing coverage for the cell. As a cellular telephone user engaged in a telephone call leaves one cell and enters another cell, a "hand off" of the telephone call is handled by the MTSO, such that the wireless communications from the user's cellular telephone are switched from the transmitter/receiver of the cell the user is leaving to the transmitter/receiver for the cell that the user is entering.

Wireless service providers typically provide wireless service to a cellular telephone owner based upon a charge to the owner for the time spent using the wireless service. The typical wireless service charges the owner a set fee per month for a set amount of time using the cellular telephone within that month. The wireless service provider usually charges substantial fees for use of the cellular telephone in excess of the allotted amount of time within the month. Additionally, certain telephone numbers called by the owner of the cellular telephone may incur additional charges above the set fee, including for example long distance calls, calls to pay services, overseas calls, etc.

Thus, there is a need for addressing these and other concerns.

SUMMARY OF THE INVENTION

The preferred embodiments of the present invention provide a system and method for enabling an owner of one or more cellular telephones to select one or more telephone number(s) to which the cellular telephone(s) may place calls, and one or more telephone number(s) from which the cellular telephone(s) may receive calls, the control of the cellular telephone(s) occurring at the wireless network.

In one preferred embodiment of the present invention, a group of cellular telephones is only allowed to receive calls from, or place calls to, telephone numbers specified by the owner. The system of the preferred embodiment includes a database at the wireless network storing the telephone numbers to which the group of cellular telephones may place calls, and from which the group of cellular telephones may receive calls; and a controller at the wireless network for controlling the calls to and from cellular telephones that are part of the group.

Other features and advantages of the present invention will become apparent to one skilled in the art upon examination of the following detailed description when read in conjunction with the accompanying drawings. It is intended that all such features and advantages be included herein within the scope of the present invention.

BRIEF DESCRIPTION OF THE DRAWINGS

Many aspects of the invention will be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

Generally stated, preferred embodiments of the present invention enable an owner of one or more cellular telephones to select one or more telephone numbers to which the cellular telephone(s) will be allowed to place calls, and to which the cellular telephone(s) will be allowed to receive call. The owner of the cellular telephone(s) preferably communicates the desired telephone number(s) to a wireless network, and the wireless network ensures that the cellular telephone(s) may only place telephone calls to and/or receives telephone calls from the telephone numbers specified by the owner.

After the owner has selected the telephone number(s), and communicated the telephone number(s) to the wireless network, an operator of the cellular telephone(s) is restricted to placing calls to, and receiving calls from, the telephone numbers selected by the owner. The operator of one of the group of cellular telephones may not alter the telephone numbers without the permission of the owner.

Figure 1:
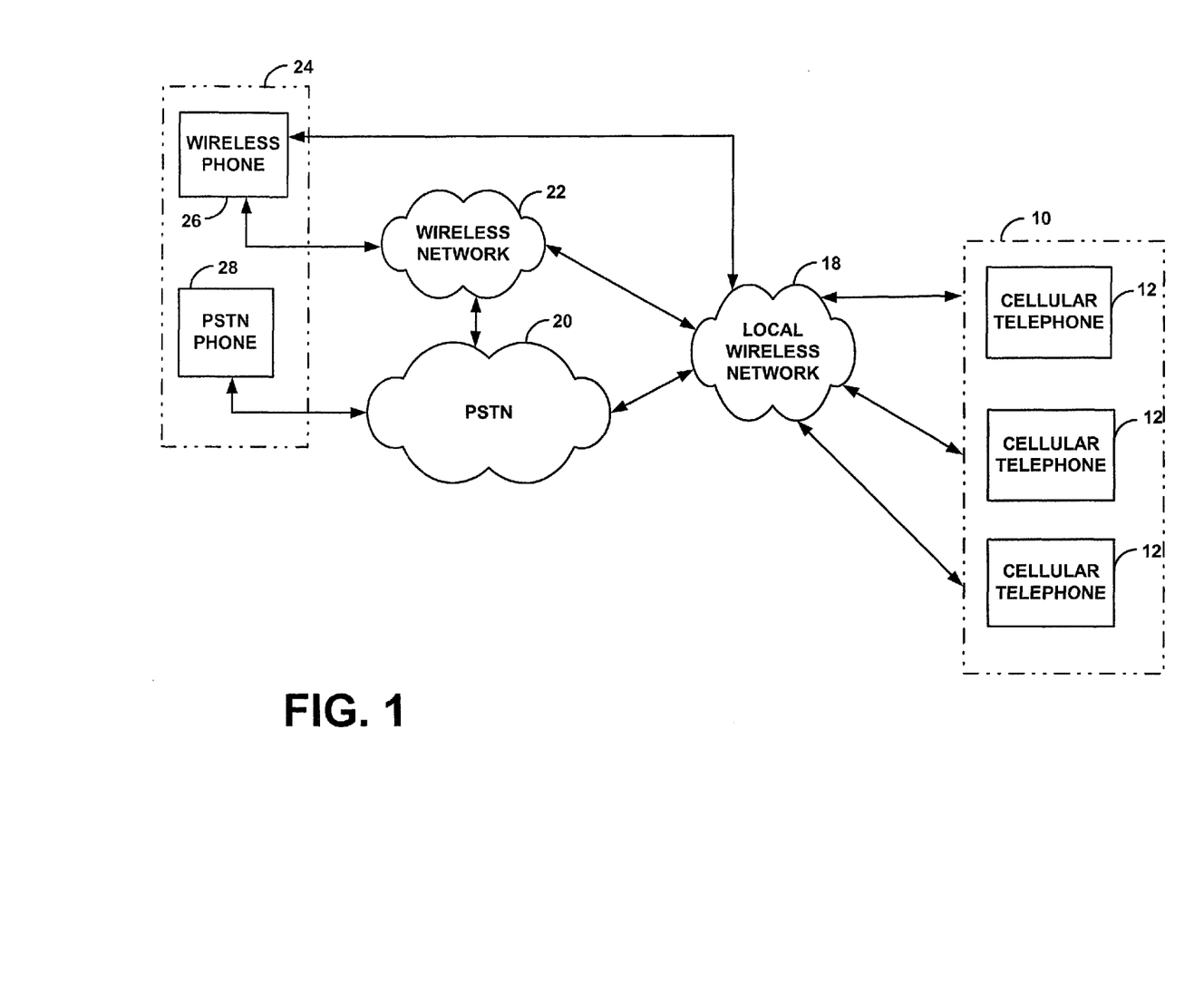
FIG. 1 is a block diagram that illustrates an exemplary telephone system that may be used with the preferred embodiments of the present invention.

FIG. 1 is a block diagram that illustrates an exemplary telephone system in which a cellular telephone 12 in a cell phone group 10 may be used. As depicted in FIG. 1, an owner may wish to use one or more cellular telephones 12 as a cell phone group 10. For example, and not intended as a limitation on the present invention, a business may wish to allow employees to use a cell phone group 10, providing a cellular telephone 12 to each of a plurality of employees for use by the employees as part of the cell phone group 10.

The operator will use the cellular telephone 12 pursuant to wireless service provided by the owner's local wireless network 18. As depicted in FIG. 1, there are various ways in which the operator will either place a call to, or receive a call from, a second party 24. For example, the second party 24 may be placing a telephone call to one of the cellular telephones 12 in the cell phone group 10 via the second party's wireless phone 26. If the second party's wireless phone 26 is in the same local wireless network 18 as the cellular telephone 12, the wireless phone 26 will transmit a signal to the local wireless network 18, which, in turn, will transmit a signal to the cellular telephone 12.

If the second party's wireless phone 26 is not within the same local wireless network 18 as the cellular telephone 12, the second party's wireless phone 26 will transmit a signal to the second party's wireless network 22. The second party's wireless network 22 will, in turn, transmit a signal either directly to the owner's local wireless network 18 or through the PSTN 20 to the owner's local wireless network 18 for transmission to the cellular telephone 12. The reverse is also true, and in the preferred embodiment, the operator may use the cellular telephone 12 to place a call to the second party 24 in a like manner.

Alternatively, the second party 24 may be placing a telephone call from a PSTN phone 28. The second party's PSTN phone 28 will communicate through the PSTN 20 to the owner's local wireless network 18 for transmission to the cellular telephone 12. Again, the reverse is also true, and in the preferred embodiment, the operator may use the cellular telephone 12 to place a call to the second party 24 in a like manner.

In accordance with one preferred embodiment of the present invention, the only telephone calls that the cellular telephone 12 would receive from the local wireless network 18 are calls placed from one of the telephone numbers selected by the owner as discussed below. Accordingly, in the preferred embodiment, if the telephone number of the second party 24 had been selected by the owner for use with the cell phone group 10, the local wireless network 18 would transmit a call from the telephone number of that second party 24 to the cellular telephone 12. Alternatively, if the telephone number of the second party 24 has not been selected by the owner for use with the cell phone group 10, the local wireless network 18 will not transmit the call placed from the telephone number of that second party 24 to the cellular telephone 12.

In the preferred embodiment of the present invention, the determination of whether or not the call will be transmitted to the cellular telephone 12 in the cell phone group 10 is made within the local wireless network 18, and not by the cellular telephone 12.

Similarly, in accordance with one preferred embodiment of the present invention, if the operator desires to use the cellular telephone 12 to place a call to a second party 24, the call will only be transmitted from the local wireless network 18 to the second party 24 if the second party's telephone number has been previously selected by the owner for use with the cell phone group 10. If the second party's telephone number has not been selected by the owner for use with the cell phone group 10, the local wireless network 18 will not transmit a telephone call from the cellular telephones 12 in the cell phone group 10 to the second party 24.

In this manner, the uses of the cellular telephones 12 in the cell phone group 10 may be controlled by the owner's previous selection of telephone numbers that may be called by the cellular telephones 12, or from which the cellular telephones 12 may receive calls.

For example and not intended as a limitation on the present invention, if the operator loses the cellular telephone 12, a finder of the cellular telephone 12 will be prevented from using the cellular telephone 12 for the finder's own purposes at the owner's expense. The finder will not be able to place calls to numbers other than those previously selected by the owner, which are unlikely to be telephone numbers the finder desires to call.

Figure 2:
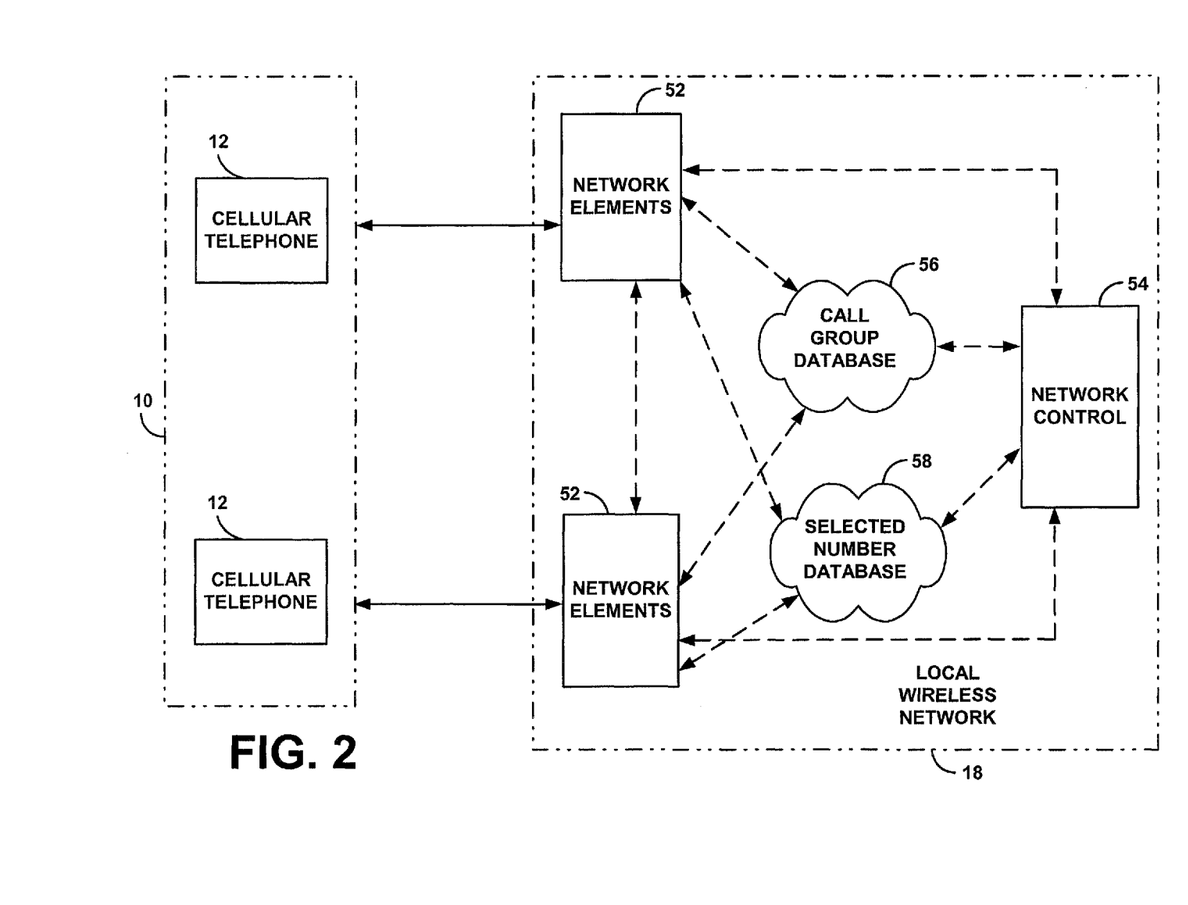
FIG. 2 shows a block diagram of selected elements of a preferred embodiment of FIG. 1.

FIG. 2 depicts a block diagram of selected elements of a preferred embodiment of the present invention. As depicted in FIG. 2, the local wireless network 18 providing wireless service to the cell phone group 10 will include various wireless network elements 52, as well as a network control element 54. In the preferred embodiment, the wireless network elements 52 will include at least a base station or an MTSO operating as described above. In addition, in the preferred embodiment, the wireless network element 52 may include logic for determining whether a cellular telephone 12 placing or receiving a telephone call, is a member of a cell phone group 10.

In one embodiment, the logic may include a trigger associated with the telephone number of the cellular telephone 12, the trigger activating whenever a call is placed to or from the cellular telephone 12 number containing the trigger. As would be known to one of skill in the art, various triggers may be used in association with wireless telephone service, and such triggers may be associated with a particular cellular telephone's 12 telephone number.

In the preferred embodiment, the logic includes a searchable call group database 56. The preferred call group database 56 is a listing of the telephone numbers of all of the cellular telephone(s) 12 the owner desires to have as part of a cell phone group 10. In one preferred embodiment there is a separate call group database 56 maintained for each cell phone group 10 of the local wireless network 18. However, in other embodiments, the local wireless network 18 may maintain one call group database 56 containing all of the cell phone groups 10 of one owner. Additionally, the local wireless network 18 may maintain one call group database 56 containing all of the different cell phone groups 10 on the local wireless network 18, regardless of owner.

In various embodiments, the call group database 56 may be contained within the wireless network elements 52, or within a separate server in communication with the wireless network element 52. In an alternative embodiment, the call group database 56 may be maintained at the network control element 54, with the wireless network element 52 in communication with the network control element 54.

In addition to identifying that a particular cellular telephone 12 belongs to a cell phone group 10, the logic will determine which of a possible plurality of different cell phone groups 10 to which a particular cellular telephone 12 belongs. In the preferred embodiment, it is possible for one owner to have multiple different cell phone groups 10, each cell phone group 10, containing a plurality of cellular telephones 12, and a cellular telephone 12 may be part of more than one cell phone group 10.

Additionally, in one preferred embodiment, the local wireless network 18 will contain a selected number database 58 associated with the cell phone group 10. In the preferred embodiment with multiple cell phone groups 10, there will be an individual selected number database 58 associated with each cell phone group 10, regardless of whether multiple cell phone groups 10 are owned by one owner. In one preferred embodiment, the selected number database 58 will be a separate database from the call group database 56. However, in other embodiments, the selected number database 58 and the call group database 56 will be combined.

In some embodiments, the selected number database 58 will be contained within the wireless network element 52. In other embodiments, the selected number database 58 will be kept within the network control element 54. In an embodiment, the selected number database 58 will be kept in a separate server in communication with the wireless network elements 52 and the network control element 54. Of course, servers and other elements in the preferred embodiment include other standard components, as would be understood by those skilled in the art, to accomplish the discussed functions.

The selected number database 58 in a preferred embodiment contains the telephone numbers from which the owner desires the cell phone group 10 to be able to receive telephone calls and/or to which the owner desires the cell phone group 10 to be able to place telephone calls. In a preferred embodiment, there will be two separate lists contained within the selected number database 58 associated with a particular cell phone group 10. The first list includes a list of numbers to which the cellular telephones 12 in the cell phone group 10 may place telephone calls. The second list in the selected number database 58 for the cell phone group 10 includes the list of telephone numbers from which the cellular telephones 12 in the cell phone group 10 may receive telephone calls.

In operation, once a cellular telephone 12 belonging to a cell phone group 10 has been identified by a wireless network element 52, or a network control element 54, as belonging to a cell phone group 10, any telephone call placed to one of the cellular telephones 12 in the cell phone group 10, or being placed by one of the cellular telephones 12 in the cell phone group 10, is compared to the selected number database 58 associated with the cell phone group 10.

In a preferred embodiment, when a cellular telephone 12 belonging to a cell phone group 10 places a telephone call to a second party 24 (FIG. 1), the local wireless network 18, upon receiving the transmission from the calling cellular telephone 12, compares the second party 24 (FIG. 1) telephone number transmitted by the cellular telephone 12 with the telephone numbers in the selected number database 58 for the cell phone group 10 to which the cellular telephone 12 belongs, in order to determine whether the telephone call may be placed.

The wireless network element 52 may perform the comparison of the second party 24 (FIG. 1) telephone number transmitted by the cellular telephone 12 to the telephone numbers contained in the selected number database 58. In an alternative embodiment, the network control element 54 compares the second party 24 (FIG. 1) telephone number transmitted by the cellular telephone 12 to the telephone numbers associated with the cell phone group 10 contained in the selected number database 58. Of course, other embodiments include other elements performing various analyses.

If the second party 24 (FIG. 1) telephone number dialed by the cellular telephone 12 and transmitted to the local wireless network 18 is not one of the telephone numbers in the selected number database 58 for the cell phone group 10, the telephone call is not forwarded from the local wireless network 18 to the called second party 24 (FIG. 1). In a preferred embodiment, the local wireless network 18 may transmit a message back to the cellular telephone 12 indicating that the call may not be placed. If the second party 24 (FIG. 1) telephone number dialed by the cellular telephone 12 and transmitted to the local wireless network 18 is one of the telephone numbers to which that cell phone group 10 is allowed to place calls, the call is forwarded by the local wireless network 18 to the second party 24 (FIG. 1) in the normal manner.

Similarly, if a second party 24 (FIG. 1) is placing a telephone call to one of the cellular telephones 12 contained within the cell phone group 10, the telephone number of the calling second party 24 (FIG. 1) is compared to the telephone numbers contained within the selected number database 58 associated with the cell phone group 10.

In a preferred embodiment, the wireless network element 52 makes the comparison of the calling second party 24 (FIG. 1) telephone number to the selected number database 58. In an alternative embodiment, among others, the network control 54 compares the calling second party 24 (FIG. 1) telephone number to the telephone numbers contained within the selected number database 58 for the cell phone group 10.

If the telephone number of the calling second party 24 (FIG. 1) does not appear in the selected number database 58 for the cell phone group 10 to which the cellular telephone 12 belongs, the local wireless network 18 does not transmit the call to the cellular telephone 12. In some embodiments, a message is transmitted back to the calling second party 24 (FIG. 1) that the call may not be placed. In the preferred embodiment, the telephone call from the calling second party 24 (FIG. 1) is treated as if the cellular telephone 12 called has another call and the calling second party 24 hears a "busy" signal. In the preferred embodiment, the cellular telephone 12 will not be aware that the calling second party 24 (FIG. 1) has attempted to place a telephone call to the cellular telephone 12.

In the preferred embodiment, if the telephone number of the calling second party 24 (FIG. 1) does appear on the list of telephone numbers from which the cellular telephones 12 in the cell phone group 10 may receive calls, the telephone call from the calling second party 24 (FIG. 1) is transmitted from the local wireless network 18 to the cellular telephone 12 in the normal manner.

Figure 3:
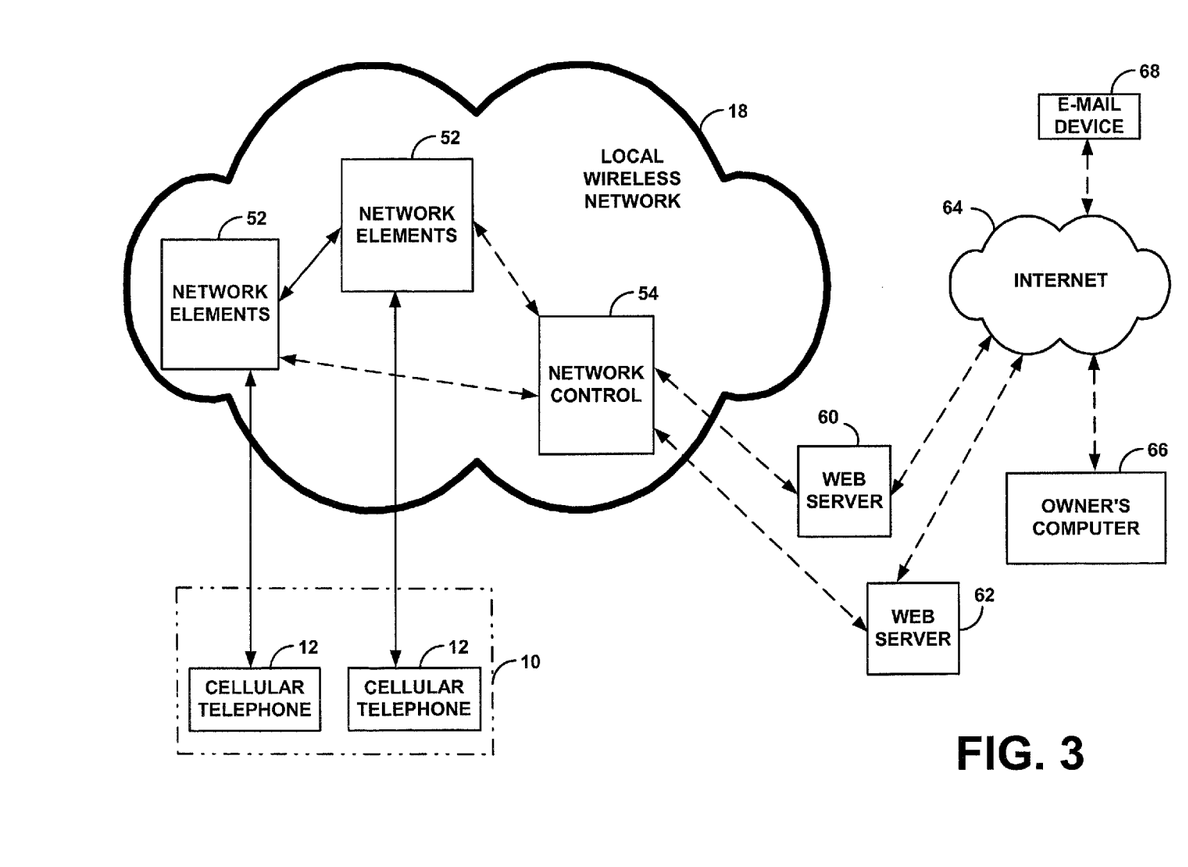
FIG. 3 shows a block diagram of additional elements in a preferred embodiment of the owner's communication with the system of the preferred embodiment depicted in FIG. 2.

The telephone numbers associated with a cell phone group 10 stored in the selected number database 58 are selected by the owner of the cell phone group 10 and communicated to the local wireless network 18 to allow control over the cell phone group 10. FIG. 3 depicts a block diagram of selected elements of a preferred embodiment illustrating ways in which the owner of a cell phone group 10 may select telephone numbers for storage in the selected number database 58 described in the preferred embodiment illustrated in FIG. 2.

As depicted in FIG. 3, in the preferred embodiment, the network control element 54 of the local wireless network is in communication with a web server 62. In the embodiment shown in FIG. 3, the web server 62 is a remote server, not physically located within a local wireless network 18. In an alternative embodiment, the web server 62 will be part of the local wireless network 18. In the embodiment where the web server 62 is part of the local wireless network 18, the web server 62 may be contained within the network control element 54, or may be a separate server in communication with the network control element 54.

In the preferred embodiment depicted in FIG. 3, the network control element 54 is in communication with a remote web server 62. In this preferred embodiment, the network control 54 will include a firewall (not shown) to ensure the security of the network control 54 and the local wireless network 18. Additionally as depicted in FIG. 3, in the preferred embodiment, the web server 62 is connected to the Internet 64. In this manner, the owner will, by use of the owner's computer 66, be able to communicate with the web server 62 through the Internet 64.

In alternative embodiments, the owner's computer 66 may communicate with the Internet 64 through an Internet service provider (ISP) (not shown), or may have a direct communication to the web server 62. Additionally, in other embodiments, the web server 62 may have its own firewall (not shown) ensuring the protection of the web server 62.

In the preferred embodiment, the owner selects the cellular telephones 12 that will be part of the cell phone group 10, as well as the telephone numbers that the cell phone group 10 may place calls to and receive calls from, and communicates the information to the local wireless network 18 through the owner's computer 66. To ensure security, the transmission from the owner's computer 66 to the local wireless network 18 through the web server 62 may include a user name/password system, and/or an encryption method such as PGP, with a predetermined PGP key.

As depicted in FIG. 3, the owner may also select the cellular telephones 12 that will be part of the cell phone group 10, as well as the telephone numbers that the cell phone group 10 may place calls to and receive calls from, via e-mail. In a preferred embodiment, the owner may send an e-mail with the owner's computer 66 or by another e-mail device 68, such as an I-pager or a personal digital assistant (PDA).

In a preferred embodiment, the network control element 54 of the local wireless network 18 will be in communication with an e-mail server 60 that receives the e-mail messages from the owner. In a preferred embodiment, the e-mail server 60 is a separate server from the web server 62. In an alternative embodiment, the e-mail server 60 and the web server 62 may be the same server.

Additionally, in the embodiment depicted in FIG. 3, the e-mail server 60 is a remote server in communication with the network control element 54 of the local wireless network 18. In this embodiment, the network control element 54 may include a firewall (not shown) to ensure the security of the network control element 54 and the local wireless network 18. In alternative embodiments, the e-mail server 60 may be part of the local wireless network 18. In these alternative embodiments, the e-mail server 60 may be a separate server in communication with a network control element 54, or may be part of the network control element 54. In yet other embodiments, the e-mail server 60 may be co-located within network control element 54 or other local wireless network 18 but still be a separate server.

In the embodiment depicted in FIG. 3, the owner will be able to send an e-mail to the e-mail server 60 to communicate to the network control element 54 information concerning one or more cell phone groups 10. To ensure security, the e-mail message will contain in the preferred embodiment, a PGP encryption, using a predetermined PGP key in order to allow the network control element 54 to be able to read the e-mail message from the owner. In this manner, the owner will be able to maintain control over the cell phone group 10, including the telephone numbers that the cell phone group 10 may place telephone calls to, as well as receive calls from. The owner will be able to maintain the control over the cell phone group 10 even when the owner cannot get to his computer 66, if the owner has a wireless e-mail device 68.

In a preferred embodiment, the owner's computer 66, will contain software allowing the owner to select telephone numbers that the cellular telephones 12 within the cell phone group 10 will be allowed to place calls to, and from which the cellular telephones 12 will be allowed to receive calls. The software allows the owner to input the information into the computer 66 for transmission to the local wireless network 18 in a variety of manners, including a menu driven system, text interface, or in the preferred embodiment, a graphical user interface (GUI) 72.

Figure 4:
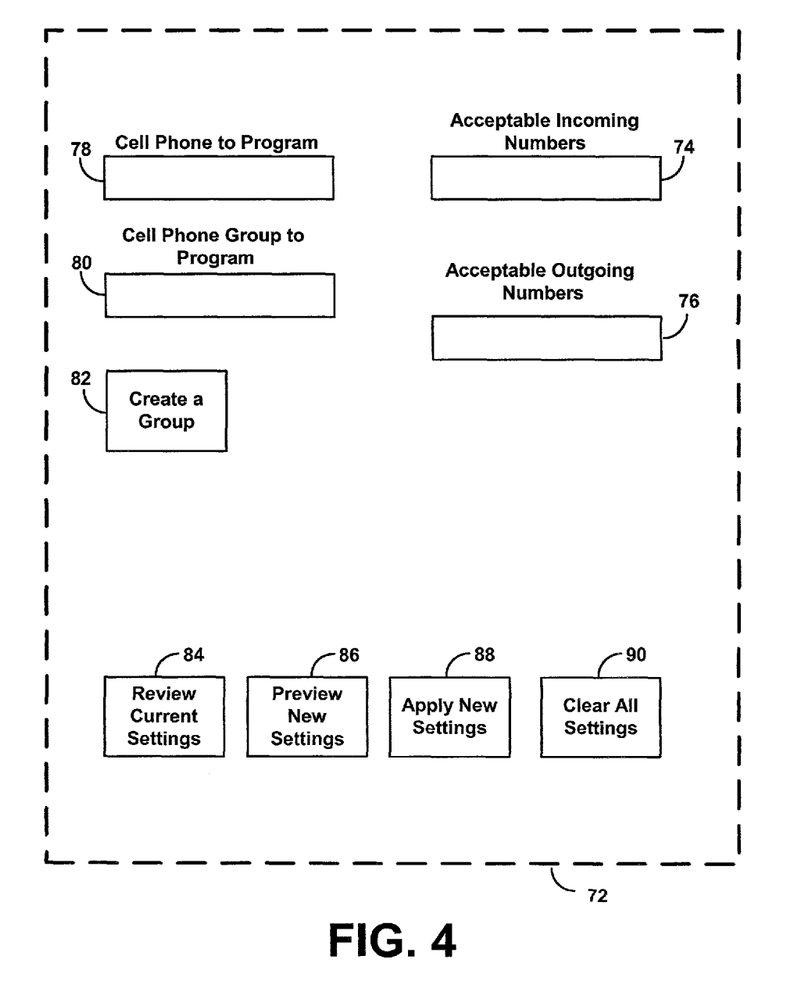
FIG. 4 shows an exemplary graphical user interface for use in the preferred embodiment depicted in FIG. 3.

FIG. 4 depicts an exemplary GUI 72 that the software on the owner's computer 66 (FIG. 3) may use to interface with the owner. As depicted in FIG. 4, the preferred GUI 72 allows the owner to select the telephone numbers from which the cell phone group 10 (FIG. 3) will receive calls and to which the cell phone group 10 will place calls to, as well as select the particular cellular telephones 12 (FIG. 3) to be part of a cell phone group 10 (FIG. 3). In the preferred embodiment depicted in FIG. 4, the GUI 72 will provide input for acceptable incoming numbers 74, as well as input for acceptable outgoing numbers 76. In this manner, the owner, through the GUI 72, may enter one or more telephone numbers in acceptable outgoing numbers 76 input representing telephone numbers to which the cellular telephones 12 (FIG. 3) within a cell phone group 10 (FIG. 3) will be allowed to place telephone calls.

Similarly, the owner may enter one or more telephone numbers through the acceptable incoming numbers 74 input representing the telephone numbers to which the cellular telephones 12 (FIG. 3) within a cell phone group 10 (FIG. 3) may receive telephone calls. The GUI 72 of the preferred embodiment depicted in FIG. 4, also provides an input for the owner to select which cellular telephones 12 (FIG. 3) belong to a specific cell phone group 10 (FIG. 3) with the cell phone to program input 78.

Similarly, the GUI 72 allows the owner to control multiple cell phone groups 10 (FIG. 3) by using the create a group input 82 to create different cell phone groups 10 (FIG. 3). The owner may then select individual cellular telephone numbers to be part of each cell phone group 10 (FIG. 3) by inputting the telephone numbers associated with the cellular telephones 12 (FIG. 3) through the cell phone to program input 78. In the preferred embodiment, an individual cellular telephone 12 (FIG. 3) may be part of more than one cell phone group 10 if the owner desires.

The telephone numbers associated with each cell phone group 10 (FIG. 3) may then be input by the owner using the acceptable incoming numbers 74 input and the acceptable outgoing numbers 76 input. Further, as depicted in the preferred GUI 72 shown in FIG. 4, an already existing cell phone group 10 (FIG. 3) will be identified by a specific name or number, and the cell phone group 10 (FIG. 3) may be edited by the owner through the cell phone group to program input 80. By activating the cell phone group to program input 80, the owner may add one or more cellular telephones 12 (FIG. 3) to an existing cell phone group 10 (FIG. 3).

Similarly, through the cell phone group to program input 80 the owner may edit the telephone numbers with which the cell phone group 10 (FIG. 3) is allowed to communicate, including adding and/or deleting telephone numbers with which the cell phone group 10 (FIG. 3) is allowed to communicate. In the preferred embodiment the owner may identify additional telephone numbers that the cell phone group 10

(FIG. 3) will be allowed to place calls to through the acceptable outgoing numbers 76 input, as well as identifying additional telephone numbers that the cell phone group 10 (FIG. 3) will be allowed to receive calls from, through the acceptable incoming numbers t 74 input. In this manner, the owner may edit all aspects of a cell phone group 10 (FIG. 3) through entering the name or number for the cell phone group 10 (FIG. 3) into the cell phone group to program input 80, and activating the input.

In the preferred embodiment, the GUI 72 will also include other functions, including a review current settings function 84, a preview new settings function 86 and apply new settings functions 88, a clear all settings function 90, as well as additional settings not depicted in FIG. 4. As would be known to one of ordinary skill in the art, these various functions allow the owner options when creating or editing cell phone groups 10 (FIG. 3).

For instance, in the preferred embodiment, activating the review current setting function 68 allows the owner to review the current settings of a particular cell phone group 10 (FIG. 3), including the individual cellular telephones 12 (FIG. 3) contained within the cell phone group 10 (FIG. 3), and the telephone numbers associated with the cell phone group 10 (FIG. 3) with which the cell phone group 10 (FIG. 3) will be allowed to communicate.

Similarly, the preview new settings function 86 allows an owner to review new information associated with a cell phone group 10 (FIG. 3), including the cellular telephones 12 (FIG. 3) to be part of the cell phone group 10 (FIG. 3), as well as the telephone numbers that will be associated with the cell phone group 10 (FIG. 3) with which the cell phone group 10 (FIG. 3) will be allowed to communicate.

Another feature of the present invention includes the ability to quickly and easily alter or edit the owner's cell phone groups 10 (FIG. 3). To that end, additional functions such as a save setting to file function (not shown) allow an owner to save to a file on the computer 66, a set of cellular telephones 12 (FIG. 3) to be part of a cell phone group 10 (FIG. 3), as well as the telephone numbers to be associated with the cell phone group 10 (FIG. 3) with which the cell phone group 10 (FIG. 3) will be allowed to communicate.

As an example, and not intended to be a limitation on the present invention, an owner may desire at different times to have a specific cell phone group 10 (FIG. 3) only be able to receive calls from or place calls to a first set of telephone numbers, while at a later time wish the cell phone group 10 (FIG. 3) to receive telephone calls from and place telephone calls to a second set of telephone numbers.

By saving the two different settings, or lists of telephone numbers, to different files on the computer 66, the owner will be able to change the desired list of telephone numbers associated with the cell phone group 10 (FIG. 3), without the need to continually reenter into the acceptable incoming numbers 74 input the telephone numbers from which the cell phone group 10 (FIG. 3) is allowed to receive telephone calls, and without continually reentering into the acceptable outgoing calls numbers 76 input, the telephone numbers to which the cell phone group 10 (FIG. 3) is allowed to place telephone calls.

Such editing of a cell phone group 10 (FIG. 2) from a file stored on the computer 66, rather than re-typing the information by hand, allows the owner to quickly edit cell phone groups 10 (FIG. 3). Additionally, the owner will be able to quickly re-edit the cell phone group 10 (FIG. 3) at a later time by accessing a second file stored on the computer 66 containing a second set of cellular telephones 12 (FIG. 3) to be part of the cell phone group 10 (FIG. 3), and/or the telephone numbers to be associated with the cell phone group 10 (FIG. 3).

Additionally, in the preferred embodiment, as depicted in FIG. 4, the GUI 72 may include various other functions, including a clear all settings function 90 which, when activated, allows the owner to clear all telephone numbers associated with a cell phone group 10 (FIG. 3), or to remove all cellular telephones 12 (FIG. 3) from the cell phone group 10 (FIG. 3).

Similarly, in the preferred embodiment, the GUI 72 may include an apply new settings function 88 which when activated by the owner, will program the settings currently selected by the owner in the cell phone to program input 78, and/or the acceptable incoming numbers 74 input, and acceptable outgoing numbers 76 input into the selected cell phone group 10 (FIG. 3).

As would be known to one of ordinary skill in the art, various other settings and/or functions may be used in the GUI 72 in the preferred embodiment of the present invention to allow the owner control over various other functions associated with editing the cell phone group 10 (FIG. 3).

In the preferred embodiment, the owner would be able to make similar selections to those depicted in FIG. 4, when sending a message to the network control element 54 (FIG. 3) via an e-mail, including an input for incoming calls allowed, input for outgoing calls allowed, input for the cell phone group 10 (FIG. 3) to be programmed or edited, and input for the cellular telephones 12 (FIG. 3) to be added or removed from a cell phone group 10 (FIG. 3).

As an additional measure to insure security and control over the cell phone group 10 (FIG. 3), the input from the owner to the local wireless network 18 (FIG. 3), whether via e-mail or through the user's computer 66 (FIG. 3), will use a user name/password system, and/or an encryption system, such as PGP, in the preferred embodiment. In this manner, the owner can insure that the cell phone groups 10 (FIG. 3) may only be edited or altered by the owner, preventing editing of any aspect of the cell phone group 10 (FIG. 3) without the owner's knowledge and/or permission.

Process and function descriptions can be understood as representing, in some embodiments, modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention. In addition, such functional elements can be implemented as logic embodied in hardware, software, firmware, or a combination thereof, among others. In some embodiments involving software implementations, such software comprises an ordered listing of executable instructions for implementing logical functions and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a computer-readable medium can be any means that can contain, store, communicate, propagate, or transport the software for use by or in connection with the instruction execution system, apparatus, or device.

It should be emphasized that the above-described embodiments of the present invention, particularly any "preferred" embodiments, are possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the claims.

What is claimed is:

1. A system for controlling an owner defined group of cellular telephones comprising:
   storage media having a set of telephone numbers associated with the owner defined group of cellular telephones stored therein; and
   a group controller connected to the storage media, the group controller configured to compare a given telephone number to telephone numbers included in the set of telephone numbers, the given telephone number being the telephone number of a given telephone associated therewith, the group controller further configured through a single group interface for updating the set of telephone numbers to allow a telephone call to be received by one of the cellular telephones included in the owner defined group of cellular telephones only if the given telephone number matches one of the telephone numbers included in the set of telephone numbers.

2. The system of claim 1, wherein the system further comprises means for an owner to configure the storage media by communicating information to the storage media.

3. The system of claim 2, wherein the information communicated to the storage media comprises a telephone number of an additional cellular telephone to add to the owner defined group of cellular telephones.

4. The system of claim 2, wherein the information communicated to the storage media comprises the set of telephone numbers associated with the owner defined group of cellular telephones.

5. The system of claim 2, wherein the means for an owner to configure comprises a computer configured to send a message.

6. The system of claim 5, wherein the message further comprises a secure message, wherein the secure message comprises HTML communications to a web server in communication with the storage media.

7. The system of claim 5, wherein the message comprises an e-mail to an e-mail server in communication with the storage media, wherein the e-mail message is sent from a wireless e-mail device.

8. The system of claim 1, wherein the set of telephone numbers further comprises a selected number database.

9. The system of claim 8, wherein the storage media containing the selected number database is located within a wireless network element.

10. The system of claim 8, wherein the group controller further comprises:
    a trigger placed on the telephone number of each cellular telephone of the owner defined group of cellular telephones, the trigger configured to activate on an incoming call to a cellular telephone in the owner defined group of cellular telephones; and
    logic configured to compare a telephone number associated with the incoming telephone call to the selected number database.

11. The system of claim 8, wherein the group controller further comprises:
    a call group database, the call group database comprising the telephone numbers of each cellular telephone in the owner defined group of cellular telephones; and
    logic configured to compare a first telephone number associated with a first cellular telephone to the telephone numbers in the call group database to determine whether the cellular telephone belongs to the owner defined group of cellular telephones, the logic further configured to compare a second telephone number associated with another telephone to the telephone numbers included in the selected number database.

12. The system of claim 11, wherein the logic is contained on a wireless network element.

13. The system of claim 8, wherein the group controller further comprises:
    a trigger placed on the telephone number of each cellular telephone of the Previously Presented group of cellular telephones, the trigger configured to activate on an outgoing call from a cellular telephone in the owner defined group of cellular telephones; and
    logic configured to compare a telephone number associated with the outgoing call to the selected number database.

14. The system of claim 1, wherein the set of telephone numbers comprises a first list and a second list, the first list comprising outgoing telephone numbers to which the owner defined group of cellular telephones may place a telephone call, the second list comprising incoming telephone numbers from which the owner defined group of cellular telephones may receive a telephone call.

15. The system of claim 14, wherein the first list comprises different telephone numbers than the second list.

16. A method for controlling a plurality of cellular telephones receiving wireless service from a wireless network, the method comprising:
    selecting through a single group interface the plurality of cellular telephones receiving service from the wireless network to comprise an owner defined cell phone group, each of the plurality of cellular telephones having a telephone number associated therewith;
    selecting through the interface a set of telephone numbers;
    associating through the interface the set of telephone numbers with the owner defined cell phone group; and
    communicating information to the wireless network, the information comprising the plurality of cellular telephones that comprise the owner defined cell phone group and the set of telephone numbers associated with the owner defined cell phone group; and
    using the set of telephone numbers to only allow a telephone call to any cellular telephone included in the owner defined cell phone group.

17. The method of claim 16, further comprising storing the set of telephone numbers in a selected number database.

18. The method of claim 16, wherein selecting a plurality of cellular telephones further comprises adding one or more cellular telephones to an existing owner defined cell phone group.

19. The method of claim 18, wherein selecting a plurality of cellular telephones further comprises removing one or more cellular telephones from the existing owner defined cell phone group.

20. The method of claim 16, wherein selecting the plurality of cellular telephones further comprises storing the telephone numbers of the plurality of cellular telephones on the wireless network.

21. The method of claim 20, wherein storing the telephone numbers of the plurality of cellular telephones on the wireless network further comprises storing the telephone numbers in a call group database.

22. The method of claim 16, wherein communicating information to the wireless network further comprises communicating with the wireless network from a computer.

23. The method of claim 22, wherein communicating with the wireless network from the computer further comprises a secure communication from the computer to the wireless network, wherein the secure communication comprises HTML communication between the computer and a web server, the web server in communication with the wireless network.

24. The method of claim 23, wherein communicating with the wireless network from the computer further comprises a secure communication from the computer to the wireless network, wherein the web server is located on the wireless network, wherein the web server is contained within a network control.

25. The method of claim 16, wherein communicating information to the wireless network further comprises an e-mail message to an e-mail server in communication with the wireless network.

26. The method of claim 25, wherein the e-mail server is located on the wireless network.

27. The method of claim 25, wherein the e-mail message further comprises an e-mail message sent from a wireless device.

28. The method of claim 25, wherein the e-mail message further comprises an e-mail message sent from a computer.

29. The method of claim 16, wherein using the set of telephone numbers to only allow a telephone call to any cellular telephone included in the owner defined cell phone group further includes:
receiving a telephone call having a given telephone number associated therewith, the telephone call being for a given cellular telephone;
determining whether the given cellular phone is included in the owner defined cell phone group;
determining whether the given telephone number is included in the set of telephone numbers; and
responsive to determining the given cellular phone is included in the owner defined cell phone group, allowing the telephone call to be connected to the given cellular phone if, and only if, the given telephone number is included in the set of telephone numbers.

30. The method of claim 16, wherein using the set of telephone numbers to only allow a telephone call to any cellular telephone included in the owner defined cell phone group further includes:
receiving a telephone call having a given telephone number associated therewith, the telephone call being from a given cellular telephone;
determining whether the given cellular phone is included in the owner defined cell phone group;
determining whether the given telephone number is included in the set of telephone numbers; and
responsive to determining the given cellular phone is included in the owner defined cell phone group, allowing the telephone call to be connected to a specific telephone having the given telephone number associated therewith phone if, and only if, the given telephone number is included in the set of telephone numbers.

31. A method for controlling a plurality of cellular telephones receiving wireless service from a wireless network, the method comprising:
receiving information input through a single group interface regarding a plurality of cellular telephones, the information comprising identification of the plurality of cellular telephones to comprise an owner defined cell phone group, the information further comprising a set of allowable telephone numbers; and
controlling the owner defined cell phone group based on the received information regarding the owner defined cell phone group, the controlling
of the owner defined cell phone group further comprising:
comparing a given telephone number with the telephone numbers included in the set of allowable telephone numbers, the given telephone number having a given telephone associated therewith; and
responsive to the given telephone number matching one of the telephone numbers included in the set of allowable telephone numbers, only allowing the receipt of a telephone call between the given telephone associated with the given telephone number and one of the cellular phones included in the owner defined cell phone group.

32. The method of claim 31, wherein an owner owns the plurality of cellular telephones, and the owner provides the received information regarding the cell phone group.

33. The method of claim 31, wherein the telephone call is a call placed to a given cellular phone, and wherein allowing the receipt of a telephone call between the given telephone associated with the given telephone number and one of the cellular phones included in the owner defined cell phone group further includes:
determining whether the given cellular phone is included in the owner defined cell phone group; and
responsive to the given cellular phone being included in the owner defined cell phone group, transmitting the telephone call to the given cellular phone if, and only if, the given telephone number is included in the set of allowable telephone numbers.

34. The method of claim 31, wherein the telephone call is a call placed from a given cellular phone, and wherein allowing the receipt of a telephone call between the given telephone associated with the given telephone number and one of the cellular phones included in the owner defined cell phone group further includes:
determining whether the given cellular phone is included in the owner defined cell phone group; and
responsive to the given cellular phone being included in the owner defined cell phone group, transmitting the telephone call from the given cellular phone if, and only if, the given telephone number is included in the set of allowable telephone numbers.

35. A system for controlling a cellular telephone of an owner defined group of cellular telephones comprising:
storage media configured to include at least one telephone number, the at least one telephone number being associated with the cellular telephone of an owner defined group of cellular telephones; and
a controller element connected to the storage media, the controller element configured through a single group interface to prevent reception of a telephone call by the cellular telephone unless the telephone call has a given telephone number associated therewith and the given telephone number matches the at least one telephone number.

36. The system of claim 35, wherein the controller element is configured to prevent completion of a telephone call to the cellular telephone placed from telephones having telephone numbers other than the at least one telephone number.

37. The system of claim 35, wherein the controller element is configured to prevent completion of a telephone call from the cellular telephone placed to telephones having telephone numbers other than the at least one telephone number.

38. The system of claim 35, wherein the controller element comprises logic contained within the storage media.

39. The system of claim 35, wherein the controller element is located within a wireless network element.

40. The system of claim 35, wherein the controller element is further configured:
to determine whether the cellular telephone is included in an owner defined group of cellular telephones, the owner defined group having more than one member; and
to determine whether the given telephone number matches the at least one telephone number;
wherein responsive to the cellular telephone being a member of the group of cellular telephones, the controller element allows completion of the telephone call if, and only if, the given telephone number matches the at least one telephone number.

41. A method for controlling a cellular telephone of an owner defined group of cellular telephones receiving wireless service from a wireless network, the method comprising:
receiving through a single group interface at least one selected telephone number;
associating the at least one telephone number with the cellular telephone of an owner defined group of cellular telephones; and
preventing completion of telephone calls to the cellular telephone and from telephones not having the at least one selected telephone number.

42. The method of claim 41, wherein preventing completion further comprises preventing completion of telephone calls placed from the cellular telephone to telephones not having the at least one selected telephone number.

43. The method of claim 41, wherein preventing completion further comprises preventing completion of telephone calls placed to the cellular telephone from telephones not having the at least one selected telephone number.

44. The method of claim 41, further comprising:
determining whether the cellular telephone is included in an owner defined group of cellular telephones, the owner defined group having more than one member;
determining whether a given telephone number matches the at least one telephone number; and
responsive to the cellular telephone being a member of the owner defined group of cellular telephones, completing a telephone call involving the given telephone number if, and only if, the given telephone number matches the at least one telephone number.

45. A method for controlling an owner defined group of cellular telephones receiving wireless service from a wireless network, the method comprising:
providing a server, the server in communication with the wireless network;
receiving a communication through a single group interface at the server, the communication comprising at least one telephone number;
associating the at least one telephone number with the owner defined group of cellular telephones;
controlling the owner defined group of cellular telephones based on the communication received on the server; and
preventing completion of a telephone call to any cellular telephone included in the owner defined group of cellular telephones placed from telephones not having the communicated telephone number.

46. The method of claim 45, wherein controlling the owner defined group of cellular telephones based on the communication received on the server further comprises preventing completion of a telephone call placed from any cellular telephone included in the owner defined group of cellular telephones to telephones not having the communicated telephone number.

47. The method of claim 45, wherein receiving a communication further comprises receiving an HTML communication.

48. The method of claim 45, wherein the owner defined group of cellular telephones is a plurality of cellular telephones.

* * * * *